United States Patent [19]
Matsuzawa

[11] Patent Number: 5,534,967
[45] Date of Patent: Jul. 9, 1996

[54] SHAKE DETECTION AND COMPENSATION SYSTEM USING HIGH-PASS FILTER ARITHMETIC MEANS

[75] Inventor: Yoshinori Matsuzawa, Hachioji, Japan

[73] Assignee: Olympus Optical Co., Ltd., Tokyo, Japan

[21] Appl. No.: 434,778

[22] Filed: May 4, 1995

[30] Foreign Application Priority Data

May 10, 1994 [JP] Japan ..................................... 6-096446

[51] Int. Cl.$^6$ ..................................................... G03B 7/08
[52] U.S. Cl. ............................................ 354/430; 354/428
[58] Field of Search ....................................... 354/428, 430

[56] References Cited

U.S. PATENT DOCUMENTS

| | | | |
|---|---|---|---|
| 4,245,254 | 1/1981 | Svensson et al. | 358/222 |
| 4,284,334 | 8/1981 | Magel | 354/24 |
| 4,511,234 | 4/1985 | Andresen | 354/428 |
| 4,623,930 | 11/1986 | Oshima et al. | |
| 5,170,255 | 12/1992 | Yamada et al. | 358/222 |
| 5,245,378 | 9/1993 | Washisu | |
| 5,291,300 | 3/1994 | Ueda | 358/335 |
| 5,335,032 | 8/1994 | Onuki et al. | 354/195.1 |
| 5,349,857 | 9/1994 | Kasanami et al. | |
| 5,412,448 | 5/1995 | Kunishige | 354/400 |
| 5,430,479 | 7/1995 | Takahama et al. | 348/208 |

FOREIGN PATENT DOCUMENTS 63-50729  3/1988  Japan.
63-275917  11/1988  Japan.

Primary Examiner—Michael L. Gellner
Assistant Examiner—Daniel Chapik
Attorney, Agent, or Firm—Frishauf, Holtz, Goodman, Langer & Chick

[57] ABSTRACT

A camera shake detection apparatus includes a camera shake sensor unit, an HPF arithmetic unit for removing drift and offset components of the camera shake sensor unit, an HPF large signal determination unit for detecting a large shake signal state from an output from the HPF arithmetic unit, a small-time-constant resetting unit for shifting an upper limit frequency for signal removal of the HPF arithmetic unit to a high-frequency side when a large shake is detected by the HPF large signal determination unit, and a time constant increasing unit for shifting the upper limit frequency for signal removal of the HPF arithmetic unit from the high-frequency side to a low-frequency side. According to this arrangement, when the camera shake is large, the offset component is actively removed by the high-pass filter. When the camera shake is small, the camera shake detection frequency band is extended. Therefore, an offset component can be removed from a signal determined to a camera shake signal at any time, and the ratio of effective components in the signal can be accurately and precisely detected.

27 Claims, 9 Drawing Sheets

SHAKE DETECTION AND COMPENSATION SYSTEM USING HIGH-PASS FILTER ARITHMETIC MEANS

BACKGROUND OF THE INVENTION

1. Field of the Invention

The present invention relates to a shake detection system using a high-pass filter arithmetic means, and more particularly, to a camera shake detection apparatus for detecting a shake in a photographing apparatus or the like, and a photographing apparatus such as a camera having a camera shake prevention function, which uses the shake detection apparatus to prevent an image degradation caused by a camera shake.

2. Description of the Related Art

An acceleration sensor, an angular velocity sensor, or a rate gyro is conventionally used as a camera shake detection apparatus for a photographing apparatus such as a camera. To make a compact equipment, these shake detection apparatuses are also downsized.

However, when a shake detection unit is made compact, an output signal contains drift and offset components because of a change in ambient temperature or an increase in temperature of the element itself in use, resulting in a degradation in output precision. As one of the smallest elements, a shake detection unit constituted by a piezoelectric element is proposed. In this case, however, not only the element is deformed by a change in temperature, but also a large drift component is produced by a change in capacitance.

FIG. 10 is a graph showing a change in signal in starting a shake gyro type angular velocity sensor serving as a shake detection sensor. Referring to FIG. 10, time is plotted along the abscissa, and an output from the shake gyro type angular velocity sensor is plotted along the ordinate. According to FIG. 10, the sensor in a stationary state exhibits very unstable signal characteristics at the start time during several tens msec (50 msec is typically exemplified in FIG. 10) after the power-on operation. During this period of time, the sensor output largely changes to an output level near that in the absence of a shake (so-called null voltage).

Thereafter, an unstable initial period of several hundreds msec (300 msec is typically exemplified in FIG. 10) starts. During this period of time, the sensor output gradually changes from a level near the predetermined null voltage to a null voltage output. Thereafter, a stable period starts, and the sensor output does not largely change during this period of time.

Referring to FIG. 10, a broken line indicates sensor output characteristics in a camera shake superposed state.

FIG. 11 is a graph showing a change in signal when a longer time has elapsed. Referring to FIG. 11, although the sensor is in the stable period, the null voltage changes. This is because the sensor output generates a drift due to a change in ambient temperature and the like. The change in null voltage due to the drift of the shake sensor, which is mainly considered to be caused by a change in temperature, causes a shake signal error although the change is very moderate at a period of several minutes.

To remove this drift component, U.S. Pat. No. 4,623,930 uses a high-pass filter to remove the low-frequency component of the angular velocity sensor, which is generated by the shake gyro. When a high-pass filter is used, a so-called cutoff frequency for determining the upper limit of the frequency to be removed by the filter is inversely proportional to the time constant of the filter. In starting the sensor or the filter, a time corresponding to the time constant, i.e., a time of $2\pi/f$ (f is the upper limit frequency to be cut off) is necessary until the signal is stabilized. Particularly, at the start time, a longer time is required to remove the error because of noise or the unstable sensor.

FIG. 12 is a block diagram of shake detection apparatus constituted by the conventional typical shake gyro type angular velocity sensor. Referring to FIG. 12, a high-pass filter (HPF) 2 removes a drift component in an output from a shake gyro type angular velocity sensor 1. This signal is amplified to a desired signal level by an amplifier 3. The amplified signal is adjusted by a voltage regulator 4 such that the offset output from the amplifier 3 is canceled, or a predetermined voltage is obtained as an output in the absence of shake. The adjusted signal is output and used as a shake signal.

In measuring a shake in the photographing apparatus to prevent a camera shake in the photographing apparatus, the camera shake has a frequency of about 15 Hz even on the high-frequency side. To the contrary, the amplitude of the shake on the low-frequency side becomes large. Therefore, to remove the sensor drift without attenuating the camera shake signal, a high-pass filter (HPF) with a large time constant is required. Particularly, in a still camera, a moderate shake in frequency is not visually corrected by the photographer unlike a video camera. Since all shakes are photographed onto one frame of the film, a shake at a lower frequency must be detected, and an HPF with a time constant of several tens sec is required.

FIG. 13 is a graph showing transition of the shake signal after starting the arrangement in FIG. 12. The sensor output value before the start is largely different from that after the start, and an input to the HPF largely changes during an initial period. For this reason, a long time corresponding to the time constant is necessary until the HPF output is converged.

In, e.g, Jpn. Pat. Appln. KOKAI Publication No. 63-50729, an integrator having an HPF capable of setting a plurality of time constants is used to integrate outputs from the acceleration sensor, and the time constants are selectively used, thereby decreasing the time required until the filter is stabilized at the start time.

Jpn. Pat. Appln. KOKAI Publication No. 63-275917 discloses an HPF for switching an analog high-pass filter consisting of a CR element from a small time constant state to a large time constant state in starting the sensor by using an impedance element and a switching element.

In the above methods, however, the sensor output value before the start is largely different from that after the start, as shown in FIG. 14. Since an input to the HPF largely changes during an initial period, a long time is required until the HPF output is converged although the effect for improving the convergence is provided.

In U.S. Pat. No. 5,245,378, a technique is described in which an alarm is issued or a release operation is inhibited before the start until the sensor output is stabilized.

However, to control the time constant and enable early rising of the HPF, the sensor must be in a stable state. More specifically, assume that, when a shake is applied to the sensor, e.g., when the photographer holds the camera by hands, the sensor is powered on, or the HPF starts to operate. In this case, if the time constant of the HPF is small, and the sensor output on the high-frequency side can be easily cut off, an offset component is contained in the HPF output upon shifting to a stationary state.

Not only at the start time, but also when a large signal is continuously input, the filter tends to have an offset component. When the photographer slowly moves the camera to track an object in a finder or to change a view angle, i.e., when the shake signal is small, the HPF removes even this moderate change in signal as far as the signal is continuously input for a long time. In this case as well, when the photographer stops moving the camera for a photographing operation, the change in signal at the stop time is faster and larger than the change so far. Therefore, the HPF output inversely produces an offset component.

For this reason, simple control of the time constant at the start time cannot provide its effect when the HPF output produces an offset component.

In addition, even when an alarm is generated, or a release operation is inhibited at the start time until the sensor is stabilized, no effect is provided in an actual photographing operation by the photographer.

SUMMARY OF THE INVENTION

It is, therefore, an object of the present invention to provide a new and improved shake detection and compensation system which can prevent an offset component to be contained in a high-pass filter output in, e.g., a photographing apparatus when a photographing operation is performed by a photographer.

According to an aspect of the present invention, there is provided a shake detection apparatus comprising: shake detection sensor means for detecting a shake state to output a shake detection signal; high-pass filter arithmetic means for performing high-pass filter arithmetic processing, thereby removing drift and offset components contained in the shake detection signal output from the shake detection sensor means; time constant increasing means for shifting an upper limit frequency for high-pass filter arithmetic processing by the high-pass filter arithmetic means from a high-frequency side to a low-frequency side; large-shake-signal determination means for detecting a large shake signal state on the basis of an output from the high-pass filter arithmetic means; and small-time-constant resetting means for shifting the upper limit frequency for high-pass filter arithmetic processing by the high-pass filter arithmetic means to the high-frequency side when the large shake signal state is detected by the large-shake-signal determination means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1A:
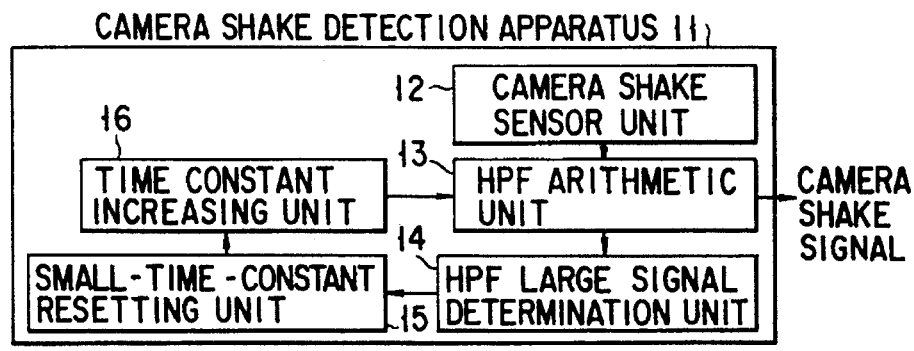
FIGS. 1A to 1D are block diagrams showing the basic arrangements of the present invention.

Reference will now be made in detail to the presently preferred embodiments of the invention as illustrated in the accompanying drawings, in which like reference characters designate like or corresponding parts throughout the several drawings.

An embodiment of the present invention will be described below with reference to the accompanying drawings.

FIGS. 1A to 1D are block diagrams showing the basic arrangements of the present invention.

FIG. 1A is a block diagram showing the first basic arrangement of a camera shake detection apparatus 11 according to the present invention. The camera shake detection apparatus 11 is constituted by a camera shake sensor unit 12, a high-pass filter (HPF) arithmetic unit 13 for removing drift and offset components of the camera shake sensor unit 12, an HPF large signal determination unit 14 for detecting a large shake signal state from an output from the HPF arithmetic unit 13, and a small-time-constant resetting unit 15 for shifting the upper limit frequency for signal removal of the HPF arithmetic unit 13 to a high-frequency side when a large shake is detected by the HPF large signal determination unit 14, and a time constant increasing unit 16 for shifting the upper limit frequency for signal removal of the HPF arithmetic unit 13 from the high-frequency side to a low-frequency side.

Figure 1B:
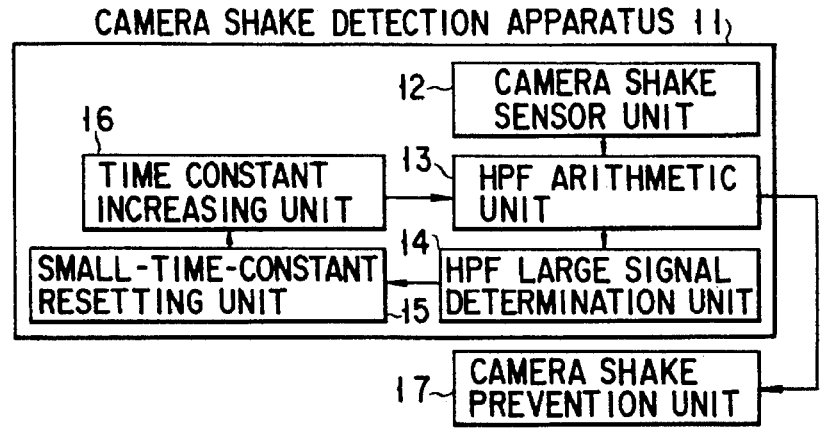

FIG. 1B is a block diagram showing the second basic arrangement of a camera shake prevention apparatus using the camera shake detection apparatus according to the present invention. This camera shake prevention apparatus is constituted by a camera shake detection apparatus 11 comprising a camera shake sensor unit 12, an HPF arithmetic unit 13, an HPF large signal determination unit 14, a small-time-constant resetting unit 15, and a time constant increasing unit 16, for detecting a shake in camera including a camera shake, and a camera shake prevention unit 17 for preventing a degradation in a to-be-photographed object image, which is caused by a shake in camera, on the basis of an output from the HPF arithmetic unit 13 of the camera shake detection apparatus 11.

Figure 1C:
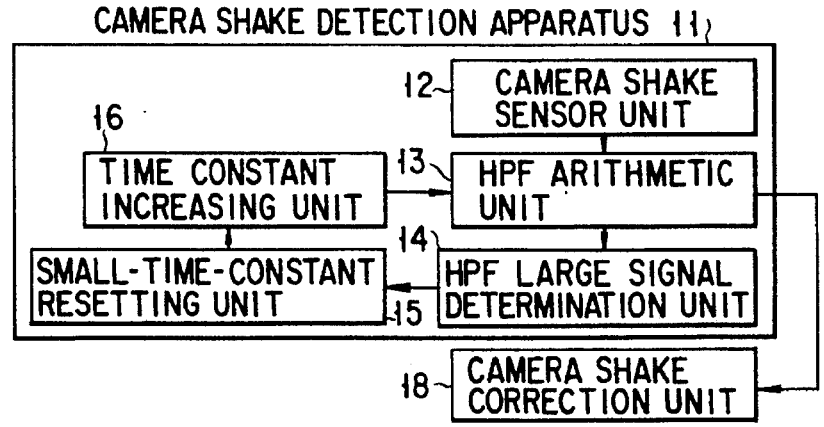

The camera shake detection apparatus or the camera shake prevention apparatus shown in FIG. 1B can have an arrangement in which the camera shake prevention unit 17 is replaced with a camera shake correction unit 18 for moving the object image on the film to correct the camera shake, as shown in FIG. 1C.

Figure 1D:
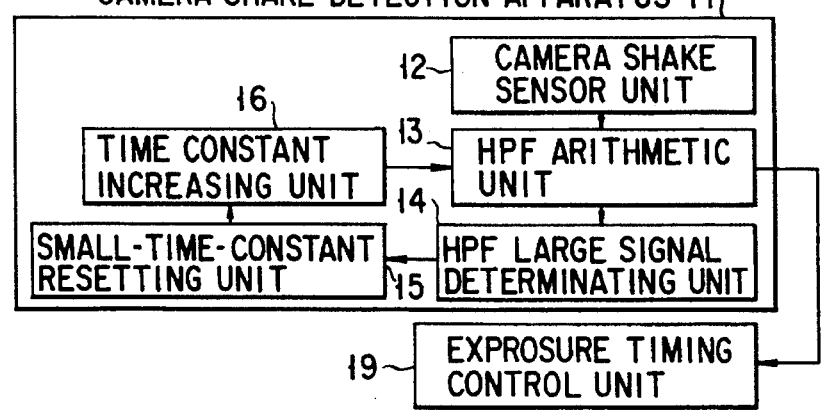

The camera shake detection apparatus or the camera shake prevention apparatus shown in FIG. 1B can also have an arrangement in which the camera shake prevention unit 17 is replaced with an exposure timing control unit 19 for setting a timing for starting exposure of the object image onto the film to a timing with a minimum shake, thereby preventing a degradation in image, which is caused by the camera shake, as shown in FIG. 1D.

The camera shake detection apparatus shown in FIG. 1A or the camera shake prevention apparatus shown in FIG. 1B can also have a camera shake detection unit capable of detecting a two-dimensional shake on an image plane.

The camera shake detection apparatus shown in FIG. 1A or the camera shake prevention apparatus shown in FIG. 1B can also have an arrangement including, as a camera shake detection means for detecting shakes in a camera, such as a camera shake, a reference voltage generation means, a differential amplification means for amplifying the difference between outputs from the reference voltage generation means and a camera shake sensor means, a differential amplification signal correction means for correcting an output from the differential amplification means in accordance with the operation of the reference voltage generation means, and an HPF arithmetic means for receiving an output from the differential amplification signal correction means.

The detailed arrangement of the present invention will be described below.

Figure 2:
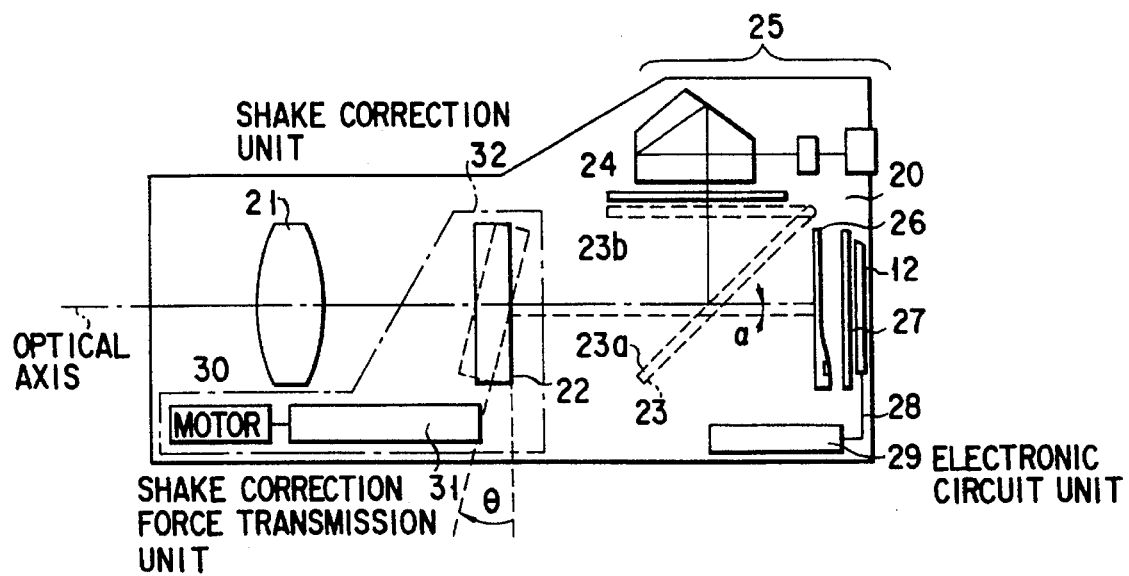
FIG. 2 is a view showing the detailed arrangement of the first embodiment of the present invention, in which a camera shake detection apparatus is applied to a so-called single-lens reflex camera.
Figure 3:
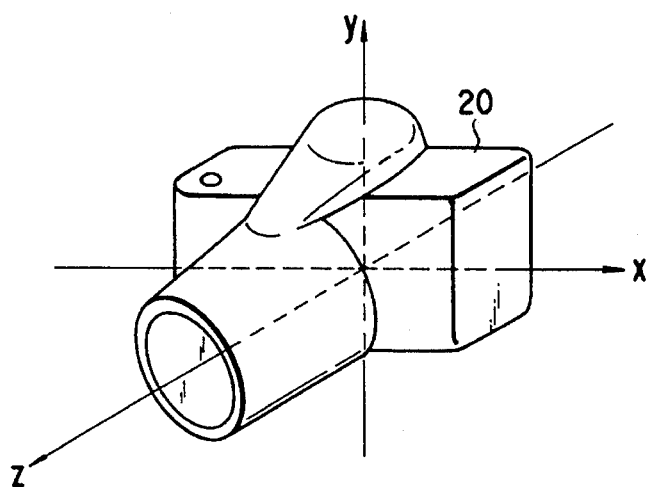
FIG. 3 is a view showing three axes, i.e., x-, y-, and z-axes of a camera.

FIG. 2 is a view showing the detailed arrangement of an embodiment of the present invention, in which the camera shake detection apparatus is applied to a so-called single-lens reflex camera. FIG. 3 is a view showing three axes, i.e., x-, y-, and z-axes of the camera.

Referring to FIG. 2, a camera body 20 incorporates a photographic lens 21, a parallel glass plate 22, a quick return mirror 23, a frame 24, a finder optical system 25, a shutter unit 26, a film 27, and an electronic circuit unit 29 for electrically controlling the operation of the camera through an electrical connecting portion 28 consisting of a flexible board. The camera shake sensor unit 12 for measuring and detecting a camera shake is arranged between the rear surface (negative side of the z-axis) of the film in the camera body 20 and the rear surface of the camera.

At a position (23a) where the quick return mirror 23 is pivoted downward, an object image passing through the photographic lens 21 is reflected upward by 90 degrees by the quick return mirror 23 and focused on the frame 24. The photographer can observe the object image through the finder optical system 25. In the photographing mode, the quick return mirror 23 is pivoted upward to a position 23b to directly guide the object image toward the shutter unit 26. At this time, the shutter unit 26 opens the shutter to enable exposure of the film 27, thereby photographing the object image.

A shake correction unit 32 constituted by a shake correction motor 30 for supplying a driving force for shake correction and a shake correction force transmission unit 31 for transmitting an output from the shake correction motor 30 to the shake correction optical system (parallel glass plate) 22 is arranged between the photographic lens 21 and the quick return mirror 23. Note that the shake correction optical system of this embodiment uses the parallel glass plate 22 as an optical axis shift optical system for parallelly shifting the optical axis.

Figure 4A:
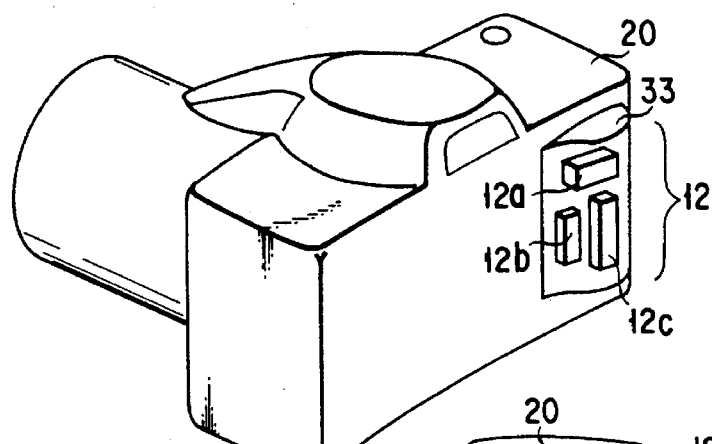
FIGS. 4A and 4B are views showing the arrangement of the camera shake detection unit in more detail.
Figure 4B:
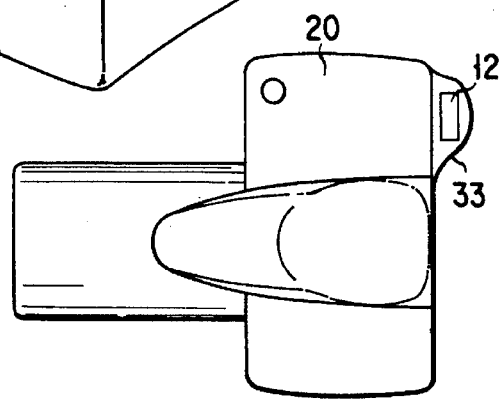

FIGS. 4A and 4B are views showing the arrangement of the camera shake detection unit 12 in more detail. A grip portion 33 projecting from the rear surface of the camera is arranged on the rear surface of the camera body 20 to improve holdability of the camera. The camera shake detection unit 12 is arranged in this grip portion 33.

The camera shake sensor 12 is a shake speed sensor for detecting a camera shake as a mechanical shake speed. More specifically, this sensor is a means for detecting a rotational shake speed and outputting angular velocity information, as shown in U.S. Pat. No. 5,349,857, and constituted by shake gyros 12a and 12b as a so-called shake type angular velocity sensor, and a shake gyro processing circuit (constituted by a shake gyro processing circuit for the shake gyro 12a and a shake gyro processing circuit for the shake gyro 12b although neither are illustrated) 12c for amplifying an output from the shake gyro to a predetermined signal level. Outputs from the shake gyros 12a and 12b, which are processed in the shake gyro processing circuit 12c are supplied to the electronic circuit unit 29 through the electrical connecting portion 28. Power to the camera shake sensor 12 is also supplied through the electrical connecting portion 29.

The function of the parallel glass plate 22 will be briefly described below. Referring to FIG. 2, when the parallel glass plate 22 is inclined by an angle θ from a position perpendicular to the optical axis and located at a position indicated by a broken line, a light beam is refracted by the front and rear surfaces of the parallel grass plate 22 respectively in opposite directions by the same angle, thereby parallelly shifting the optical axis. By using this function, the image is moved in a direction to offset image movement caused by a camera shake, thereby correcting or preventing image movement and a degradation in image, which are caused by a camera shake.

Figure 5:
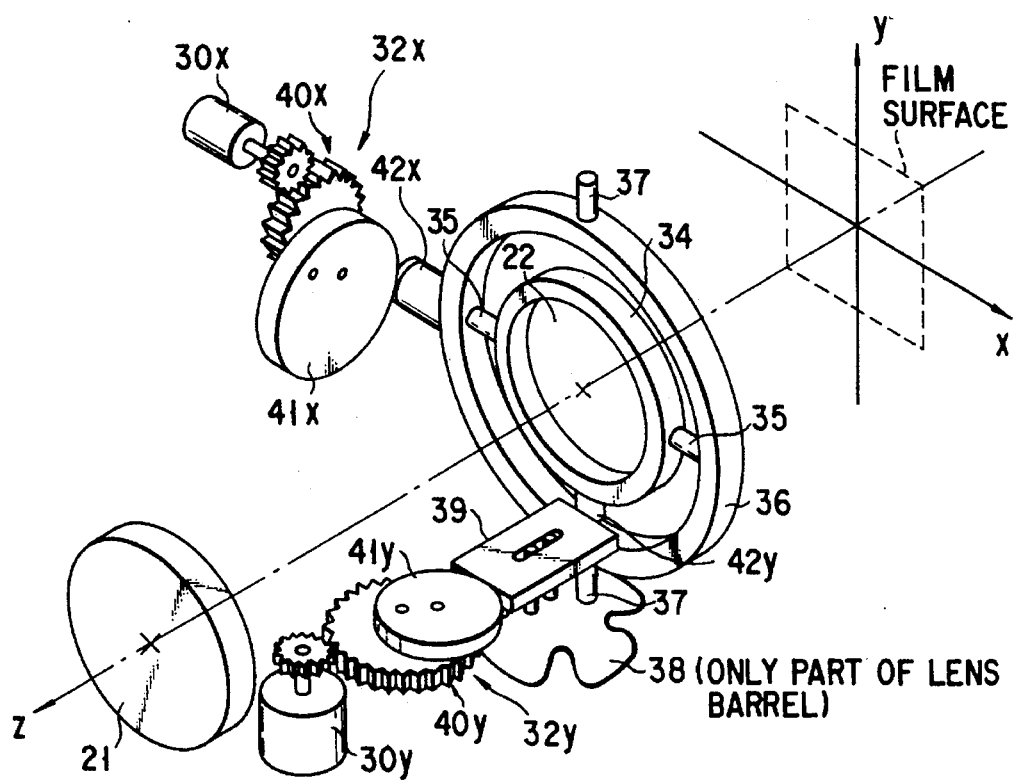
FIG. 5 is a perspective view of the entire inclination unit for a parallel glass plate.

FIG. 5 is a perspective view of the entire inclination unit for the parallel glass plate 22.

Referring to FIG. 5, the parallel glass plate 22 is attached to a gimbal frame 34. The gimbal frame 34 is pivotally attached to a gimbal frame 36 by a gimbal shaft 35. The gimbal frame 36 is pivotally attached to a lens barrel 38 by a gimbal shaft 37. As described above, the parallel glass plate 22 is attached to the lens barrel 38 by a gimbal mechanism.

Rotations of shake correction motors 30x and 30y are transmitted to the shake correction optical system constituted by the parallel glass plate 22 attached to the above-described gimbal to freely rotate about the y- and x-axes, through shake correction force transmission units 32x and 32y respectively consisting of gears 40x and 40y, eccentric cams 41x and 41y, a cam plate 39 and gimbal rollers 42x and 42y, and the above-described gimbal mechanism. Upon pivotal motion of the parallel glass plate 22, the position of the object image on the film can be changed. Changes in rotations of the motors 30x and 30y correspond to a change in image movement speed for correction, as a matter of course.

Japanese Patent Application No. 6-25321 by the same assignee as in the present application describes that a rotational shake speed $\omega b$ of the camera, which is detected by the shake gyro, and an inclination speed $\omega s$ of the parallel glass plate for correction can be respectively approximated to the following relationships:

$$\omega s = \{f \cdot (1+B)/(D \cdot (1-1/n)) - 1\} \cdot \omega b$$

or $$\omega s = \{f/(D \cdot (1-1/n)) - 1\} \cdot \omega b$$

where n is the refractive index of the parallel glass plate 22, D is the thickness of the parallel glass plate 22, f is the focal length of the photographic lens 21, and B is the image magnification.

An arithmetic processing unit such as a CPU for generating a driving signal for the shake correction motor 30 for inclining the parallel glass plate 22 is arranged in the electronic circuit unit 29 in FIG. 2 to cancel an image blur on the basis of the shake angular velocity information of the camera body 20, which is detected by the camera shake sensor 12.

Figure 6:
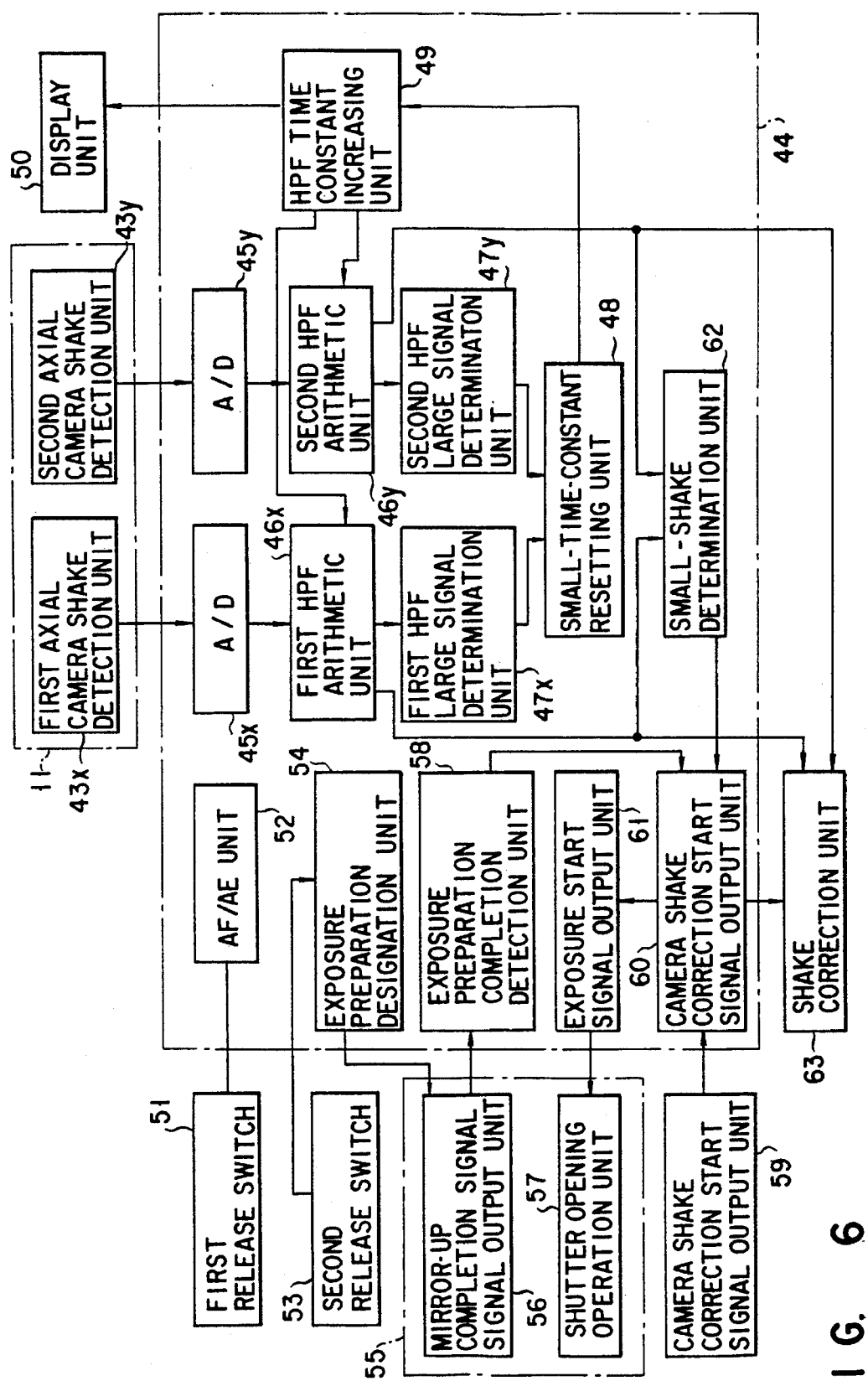
FIG. 6 is a block diagram of an electrical signal processing block for preventing image movement caused by a camera shake.

FIG. 6 is a block diagram of electrical signal processing for preventing image movement caused by a camera shake.

The camera shake detection apparatus 11 comprises a first axial camera shake detection unit 43x consisting of a first camera shake sensor and a processing circuit and a second axial camera shake detection unit 43y consisting of a second camera shake sensor and a processing circuit. Angular velocity signals representing a camera shake, which are output from the first and second axial camera shake detection units 43x and 43y, are sent to a CPU 44 of the electric circuit unit.

The angular velocity signals of the two axes are respectively digitized in first and second A/D converters 45x and 45y in the CPU 44 to digitally process the signals. The angular velocity signal digitized in the first A/D converter 45x is proportional to the shake speed in the x-axis direction of the frame. The angular velocity signal digitized in the second A/D converter 45y is proportional to the shake speed in the y-axis direction of the frame.

An output from the first A/D converter 45x is subjected to HPF processing in a first HPF arithmetic unit 46x while an output from the second A/D converter 45y is subjected to HPF processing in a second HPF arithmetic unit 46y. Outputs from the first and second HPF arithmetic units 46x and 46y are sent to a small-time-constant resetting unit 48, a small-shake determination unit 62, and a shake correction unit 63.

The HPF coefficient for determining the time constant for the HPF arithmetic operation performed in the first and second HPF arithmetic units 46x and 46y is determined by an HPF time constant increasing unit 49 for receiving an output from the small-time-constant resetting unit 48.

In arithmetic operations in the first and second HPF arithmetic units 46x and 46y, the change value of the shake signal is added to a value obtained upon multiplying the preceding HPF arithmetic operation result by a coefficient (HPF coefficient) larger than zero and smaller than one, thereby removing a low-frequency component. An HPF arithmetic output $H_0$ can be obtained from the following recurrence equation:

$$H_0 = x_0 - x_1 + (K_H \times H_1) \tag{1}$$

where $K_H$ is the HPF coefficient, $x_1$ is the preceding input shake signal, $x_0$ is the current input shake signal, and $H_1$ is the preceding HPF arithmetic output. The first and second HPF arithmetic units 46x and 46y operate in accordance with this equation.

The HPF time constant increasing unit 49 defines the HPF coefficient $K_H$ as follows:

$$K_H = K_{H0} + (\text{Number of HPF Arithmetic Operations}) * K_{HR} \tag{2}$$

(for $K_H < K_{Hmax}$)

where $K_{H0}$ is the set value for obtaining a minimum HPF time constant, which is the initial value set by the small-time-constant resetting unit 48 and used for HPF time constant control. The cutoff frequency is normally preferably set at 5 to 10 Hz. $K_{HR}$ is the coefficient for determining a rate for gradually increasing the time constant in accordance with the number of HPF arithmetic operations. $K_{Hmax}$ is the HPF coefficient for obtaining a maximum time constant. The cutoff frequency is preferably set at 0.1 Hz. To more accurately correct a shake, the cutoff frequency is preferably lower. The coefficient $K_{HR}$ is set such that the time necessary for shift from the coefficient $K_{H0}$ to the coefficient $K_{Hmax}$ falls within a range of 0.5 to 2 seconds.

While the HPF time constant increasing unit 49 increases the HPF time constant, i.e., while $K_H < K_{Hmax}$, this state is informed to the photographer by using a display unit 50. With this operation, an alarm for a large shake can be issued while the photographer can recognize the alarm.

The CPU 44 is also connected to a first release switch 51, a second release switch 53, an exposure unit 55, a camera shake correction start signal output unit 59, and a camera shake correction unit 63. The first release switch 51 is connected to an AF/AE unit 52 in the CPU 44. The AF/AE unit 52 performs an AF (automatic focusing) operation for focusing and an AE (automatic exposure) operation for calculating and setting an appropriate exposure value (shutter speed and f-number) corresponding to the luminance of the object when the first release operation is detected by the first release switch 51.

On the other hand, the second release switch 53 is connected to an exposure preparation designation unit 54. With this arrangement, a photographing start designation operation by the photographer can be detected. When the second release switch 53 is operated, the exposure preparation designation unit 54 causes the exposure unit 55 to prepare for exposure. In preparation for exposure, the stop-down operation of the stop unit and retreat of the quick return mirror from the optical path are performed as in a known camera. Thereafter, preparation for exposure is made until exposure of the film is enabled upon opening the shutter.

The exposure unit 55 performs exposure of a known film and has a mirror-up completion signal output unit 56 for detecting completion of a mirror-up operation for retreating the quick return mirror 23 from the optical path and outputting the signal representing completion of the mirror-up operation, and a shutter opening operation unit 57 for performing an operation of passing a light beam from the object, which is normally shielded by the shutter, to the film.

When the mirror-up operation is completed, the mirror-up completion signal output unit 56 determines that preparation for exposure is completed and supplies an exposure preparation completion signal to an exposure preparation completion detection unit 58 in the CPU 44.

The camera shake correction start signal output unit 59 is commonly used as the second release switch 53.

A camera shake correction start signal output unit 60 receives signals from the small-shake determination unit 62, the exposure preparation completion detection unit 58, and the camera shake correction start signal output unit 59. When preparation for exposure is completed, and it is determined that shake correction can be started without any problem, the camera shake correction start signal output unit 60 designates the shake correction unit 63 to start shake correction, and at the same time, designates an exposure start signal output unit 61 to output an exposure start signal when a predetermined time has elapsed.

The exposure start signal from the exposure start signal output unit 61 is supplied to the shutter opening operation unit 57 in the exposure unit 55. The shutter is then opened to start exposure of the object image onto the film.

Note that the mirror-up completion signal output unit 56 may be constituted by a status detection unit consisting of a switch used in a known exposure unit. Similarly, the shutter opening operation unit 57 can be a unit applied with an attractive/repulsive force of a magnet and an electromagnet used in a known exposure unit.

In this embodiment, completion of preparation for exposure is determined upon detecting completion of the mirror-up operation. However, another status detection means for detecting, e.g., completion of the stop-down operation of the stop can also be used, or a combination thereof can also be used.

In this embodiment, a signal obtained upon completion of preparation for exposure is used. However, exposure is actually started with a time delay for signal transmission or a delay of a predetermined time after shake correction. In consideration of the above situation, an expectation signal representing that preparation for exposure will be quickly completed may also be output within the delay time.

The shake correction unit 63 performs shake correction in accordance with a value based on a shake signal obtained from the first and second HPF arithmetic units 46x and 46y after the shake correction start signal output unit 60 designates to start shake correction.

In this embodiment, shake correction is performed along the two axial directions in the frame. However, even when correction is performed along only one direction, the same effect can be obtained with substantially the same arrangement except that shake detection and correction are set along one axis.

Figure 7:
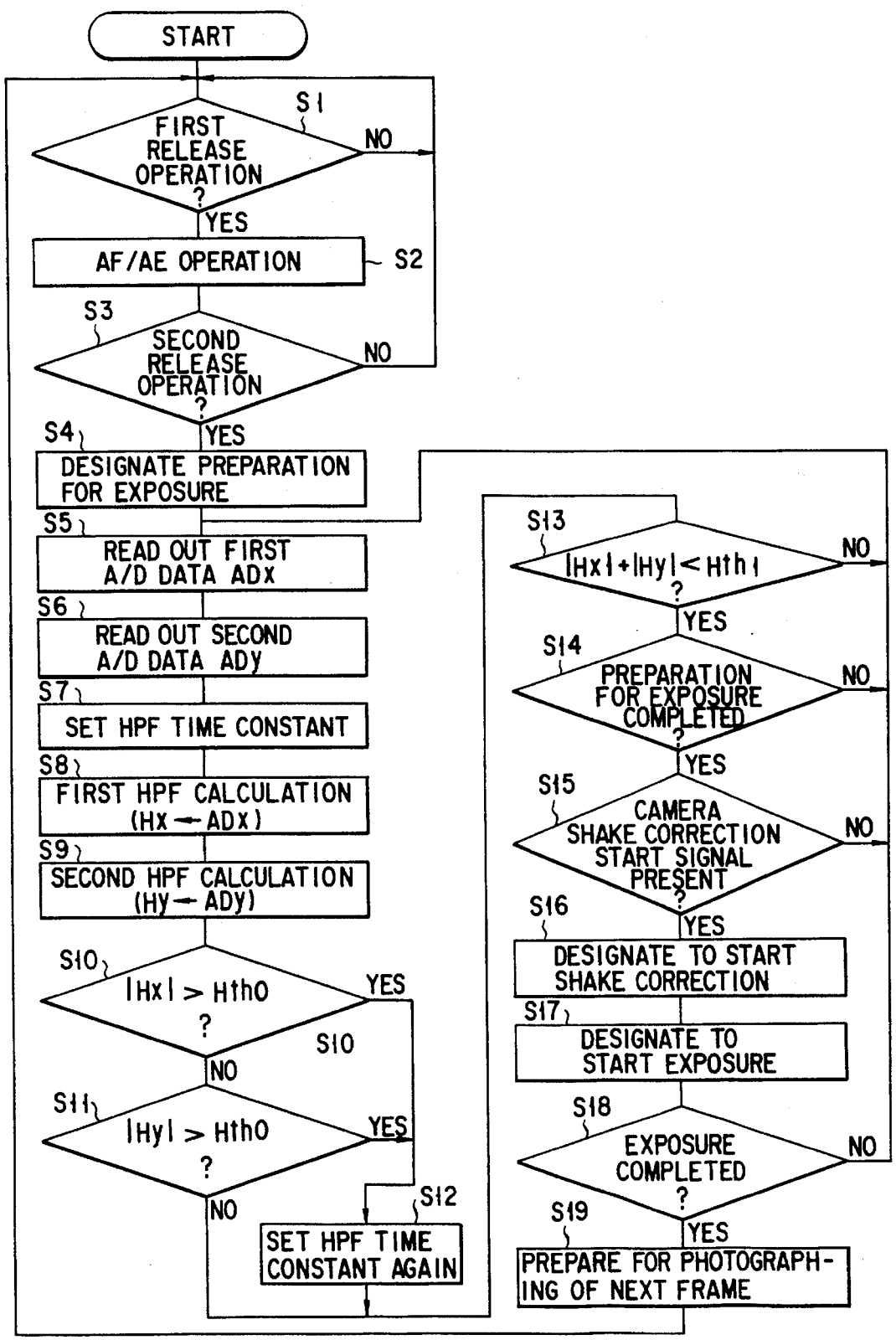
FIG. 7 is a flow chart for explaining the operation of a CPU 44 in FIG. 6.

The operation of the CPU 44 will be described below with reference to the flow chart in FIG. 7.

After a power-on operation, the CPU 44 checks the presence/absence of the operation of the first release switch 51 in step S1 and repeats this process until an operation is detected. If the operation of the first release switch 51 is detected, the flow advances to step S2, and the CPU 44 uses the AF/AE unit 52 to perform a focus adjustment operation, object luminance measurement, and exposure value calculation. In step S3, the CPU 44 checks the presence/absence of the operation of the second release switch 53. If no operation is detected, the flow returns to step S1. If the operation of the second release switch 53 is detected, the flow advances to step S4, and the CPU 44 uses the exposure preparation designation unit 54 to cause the exposure unit 55 to prepare for exposure.

In step S5, the CPU 44 uses the first A/D converter 45x to digitize an output from the first camera shake sensor, thereby obtaining data ADx. In step S6, the CPU 44 uses the second A/D converter 45y to digitize an output from the second camera shake sensor, thereby obtaining data ADy.

In step S7, the CPU 44 determines the HPF coefficient by the HPF time constant increasing unit 49. If the time constant is larger than the maximum value $K_{Hmax}$, the CPU 44 causes the display unit 50 to display it to inform the photographer of it. In step S8, the CPU 44 uses the HPF coefficient set in step S7 to perform HPF arithmetic processing of the data ADx, thereby obtaining data Hx. In step S9, the CPU 44 performs HPF arithmetic processing of the data ADy, as in step S8, thereby obtaining data Hy.

In step S10, the CPU 44 compares the absolute value of the data Hx with threshold level data $Hth_0$ for determining whether the time constant is set to a small value again. If the HPF arithmetic operation result data Hx is larger than the threshold level data $Hth_0$, the flow advances to step S12. Otherwise, the flow advances to step S11, and the CPU 44 compares the absolute value of the data Hy with the threshold level data $Hth_0$. If the HPF arithmetic operation result data Hy is larger than the threshold level data $Hth_0$ in step S11, the flow advances to step S12. Otherwise, the flow advances to step S13.

In step S12, the CPU 44 sets the HPF time constant to the initial value $K_{H0}$ again and simultaneously clears loop pass count data for changing the HPF coefficient to "0". In step S13, the CPU 44 compares the sum of the absolute values of the HPF arithmetic operation result data Hx and Hy with threshold level data $Hth_1$ for determining whether the shake is so small that camera shake correction or exposure can be performed. If the sum of the absolute values of data Hx and Hy is larger than the threshold level data $Hth_1$, the flow returns to step S5. If it is determined that the shake is so small that exposure or shake correction can be performed, the flow advances to step S14.

In step S14, the CPU 44 uses the exposure preparation completion detection unit 58 to check whether preparation for exposure is completed. If NO in step S14, the flow returns to step S5. Otherwise, the flow advances to step S15. In step S15, the CPU 44 checks the presence/absence of a signal from the camera shake correction start signal output unit 59. If YES in step S15, the flow advances to step S16. Otherwise, the flow returns to step S5.

In step S16, the CPU 44 outputs a shake correction start signal to the shake correction unit 49. In step S17, the CPU 44 confirms the elapse of time of several to twenty msec after output of the shake correction start signal in step S16 and thereafter designates to start exposure by the exposure start signal output unit 61, thereby giving a margin for starting the actuator. This elapse of time is measured by the loop pass count. When the margin time has not elapsed yet, the flow immediately advances to step S18.

In step S18, the CPU 44 checks whether a predetermined time has elapsed after the start of exposure. If it is a time to finish exposure, the flow advances to step S19. Otherwise, the flow returns to step S5. In step S19, the CPU 44 performs processing for preparation for photographing the next frame, i.e., a shutter closing operation, rearrangement of the quick return mirror 23 onto the optical path, retreat of the stop unit from the optical path, and rewinding of the film by one frame, and the flow returns to step S1.

In the above embodiment, the shake correction optical system is constituted by inclining the parallel glass plate. However, the shake correction optical system is not limited to this and may also be of a type for shifting or inclining a known variable vertex angle prism or an optical group as part of an optical system in a direction perpendicular to the optical axis, thereby moving the image.

In the above embodiment, shake correction is performed after the exposure preparation completion signal is detected. However, the exposure operation and the shake correction operation can be performed independently of each other, thereby using the exposure start signal for shake correction to perform the actual exposure operation. In this case, a timer means for delaying shake correction during the time of preparation for exposure can be used to synchronize the two operations to some extent, thereby finally synchronizing these operations with each other at the start time of exposure.

In the above embodiment, the camera shake correction means is constituted by the camera shake correction means for moving the object image on the film and correcting the camera shake. However, even when the optical means for preventing a camera shake is not provided, the timing for starting exposure of the object image onto the film can be set to a timing with a minimum shake. That is, the present invention can be easily applied to a camera shake prevention system using timing control.

The second embodiment of the present invention will be described below.

Figure 8:
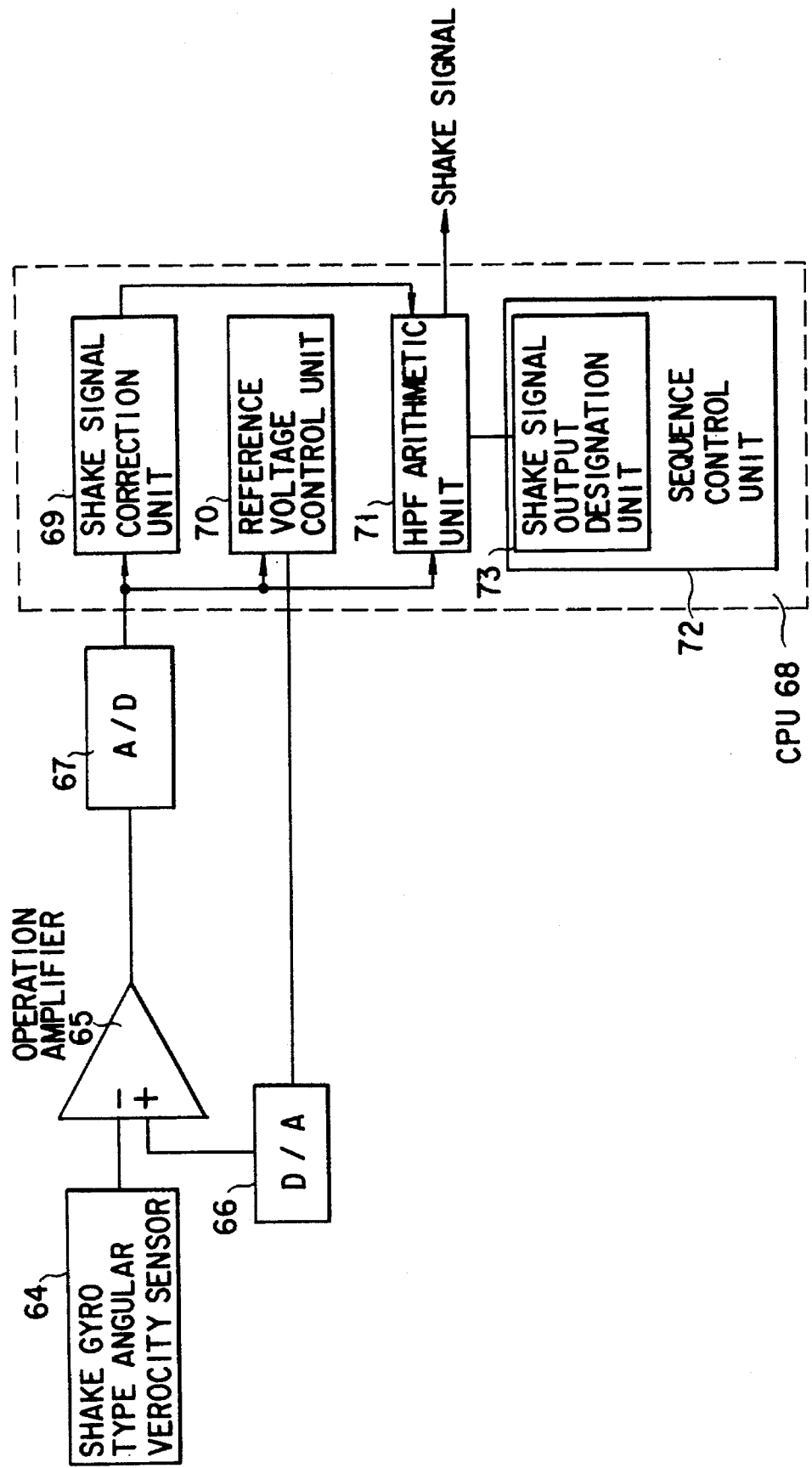
FIG. 8 is a block diagram of the main part of a camera shake detection apparatus according to the second embodiment of the present invention.

FIG. 8 is a block diagram of the main part of a camera shake detection apparatus according to the second embodiment of the present invention.

An output from a shake gyro type angular velocity sensor 64 serving as a shake detection sensor for detecting a shake is connected to the inverting input terminal of an operational amplifier 65 serving as a differential amplification means. A D/A converter 66 serving as a reference voltage output means is connected to the noninverting input terminal of the operational amplifier 65. With this arrangement, an output from the shake gyro type angular velocity sensor 64 is inverted and amplified.

An output from the operational amplifier 65 is connected to an A/D converter 67 to be digitized. The digital signal is output to a shake signal correction unit 69, a reference voltage control unit 70, and an HPF arithmetic unit 71 in a CPU 68. A shake signal output designation unit 73 of a sequence control unit 72 is connected to the HPF arithmetic unit 71. The above-described shake signal correction unit 69, the reference voltage control unit 70, the HPF arithmetic unit 71, the sequence control unit 72, and the shake signal output designation unit 73 constitute a program means operated by the CPU 68.

The HPF arithmetic unit 71 performs time constant control described in the above embodiment.

Assume that the shake gyro type angular velocity sensor 64 has a sensitivity representing that a voltage of 0.001 [V] is output one revolution per second. Assume that the A/D converter 67 quantizes a voltage of 0 to 5 V by a resolving power of 10 bits, and a resolving power of a camera shake signal, which is necessary for preventing a camera shake, is 0.02388 [deg/sec]. In this case, within the entire range of the A/D converter 67, an angular velocity of 24.43 [deg/sec] (=0.02388×1023) can be detected. To obtain a camera shake signal with an angular velocity of 24.43 [deg/sec] within a voltage range of 5 V, the operational amplifier 65 must output a voltage of 0.2046 [V] for 1 deg/sec and have an amplification factor β of 204.6.

To control the output from the operational amplifier 65 to fall within a range of 2.5 V ±0.833 V (within a range of 1.67 V (⅓ a voltage of 0 to 5 V)), a predetermined first differential amplification reference value in the reference voltage control unit 70 is set to 3.33 V, and a predetermined second differential amplification reference value is set to 1.67 V. The output from the operational amplifier 65 changes by 1.67 V every time the reference voltage is changed once. At this time, when an output from the A/D converter 67 is to be determined by the reference voltage control unit 70, the predetermined first differential amplification reference value is 682 LSB, and the predetermined second differential amplification reference value is 341 LSB.

With this operation, when the digital value input to the D/A converter 66 changes by one, the output changes by 0.008162 V. The output changes by 1.67 V upon differential amplification.

The output from the operational amplifier 65 changes by 1.67 V every time the reference voltage is changed once. This change value corresponds to 341 LSB as the number of quantization levels of the A/D converter 67. When the reference voltage is changed by the reference voltage control unit 70, the shake signal correction unit 69 corrects an output from the A/D converter 67 by this change value. This change value is represented by Δx. In the HPF arithmetic operation, the shake signal quantized by the A/D converter 67 is subjected to the HPF arithmetic processing. Thereafter, it is determined whether the reference voltage must be increased or decreased by the reference voltage control unit 70. If the reference voltage must be increased, the reference voltage is changed through the D/A converter 66. Thereafter, the shake signal is corrected by the shake signal correction unit.

In the arithmetic operation in the HPF arithmetic unit 71, the change value of the shake signal is added to a value obtained upon multiplying the preceding HPF arithmetic operation result by a coefficient larger than zero and smaller than one, thereby removing a low-frequency component. As described above, an HPF arithmetic output $H_0$ can be obtained from the same recurrence equation as equation (1):

$$H_0 = x_0 - x_1 + (K_H \times H_1)$$

where $K_H$ is the HPF coefficient, $x_1$ is the preceding input shake signal, $x_0$ is the current input shake signal, and $H_1$ is the preceding HPF arithmetic output.

If an output from the operational amplifier 65 is higher than 3.33 V, the shake signal output from the A/D converter 67 has a value of 682 LSB or more, as described above. In this case, however, the reference voltage must be increased to decrease this value. When the differential amplification reference voltage supplied from the D/A converter 66 to the noninverting input terminal of the operational amplifier 65 is dropped by one level of the D/A converter 66, the voltage output from the operational amplifier 65 is dropped by 1.67 V, as described above. This voltage drop is reflected on next shake signal detection in the A/D converter 67.

In the next HPF arithmetic operation, A/D data $x_0'$ is detected as a voltage dropped by 1.67 V as compared to that obtained without changing the reference voltage. This voltage is lower by 1.67 V than the preceding A/D value for the next HPF arithmetic operation, i.e, the current A/D value even in the absence of shake signal, resulting in an error. For this reason, the preceding A/D value for the next HPF arithmetic operation, i.e, the current A/D value is similarly corrected to be a value lower by 1/67 V. More specifically, a next HPF arithmetic output $H_0'$ is substantially calculated from a current HPF arithmetic output $H_0'$, the current A/D result, and the A/D correction value Δx, as follows:

$$H_0' = x_0 - (x_0 - \Delta x) + (K_H \times H_0)$$

The difference in voltages between the current and next A/D values, which is generated by a change in reference voltage, can be canceled, thereby accurately performing the HPF arithmetic operation.

As described above, the shake signal correction unit 69 has a function of correcting the A/D result in accordance with correction of the reference voltage by the reference voltage control unit 70.

As for the arithmetic operation by the HPF arithmetic unit 71, the arithmetic operation or the output is suppressed by the shake signal output designation unit 73 at the start time of the shake detection apparatus so as not to consider a rapid change in signal in starting the sensor. The HPF arithmetic operation or output of the HPF arithmetic operation result is performed, after output of a shake signal is designated. When the HPF arithmetic operation data $H_0$ so far is set to "0", output of the HPF arithmetic operation result can be started from "0", i.e., from a reset state. Alternatively, when the arithmetic operation is to be started from a predetermined value, the predetermined value can be substituted in a flag representing the register and code of the data $H_0$, and the arithmetic operation is started, thereby easily setting the initial state. This is also the characteristic feature of the digital HPF.

As described above, when the shake signal correction unit 69 and the D/A converter 66 are operated in a manner interlocked with the reference voltage control unit 70, an accurate shake signal can be obtained. With the operation of the HPF arithmetic unit 71, low-frequency drift and offset components can be removed, thereby obtaining a desired shake signal.

Figure 9:
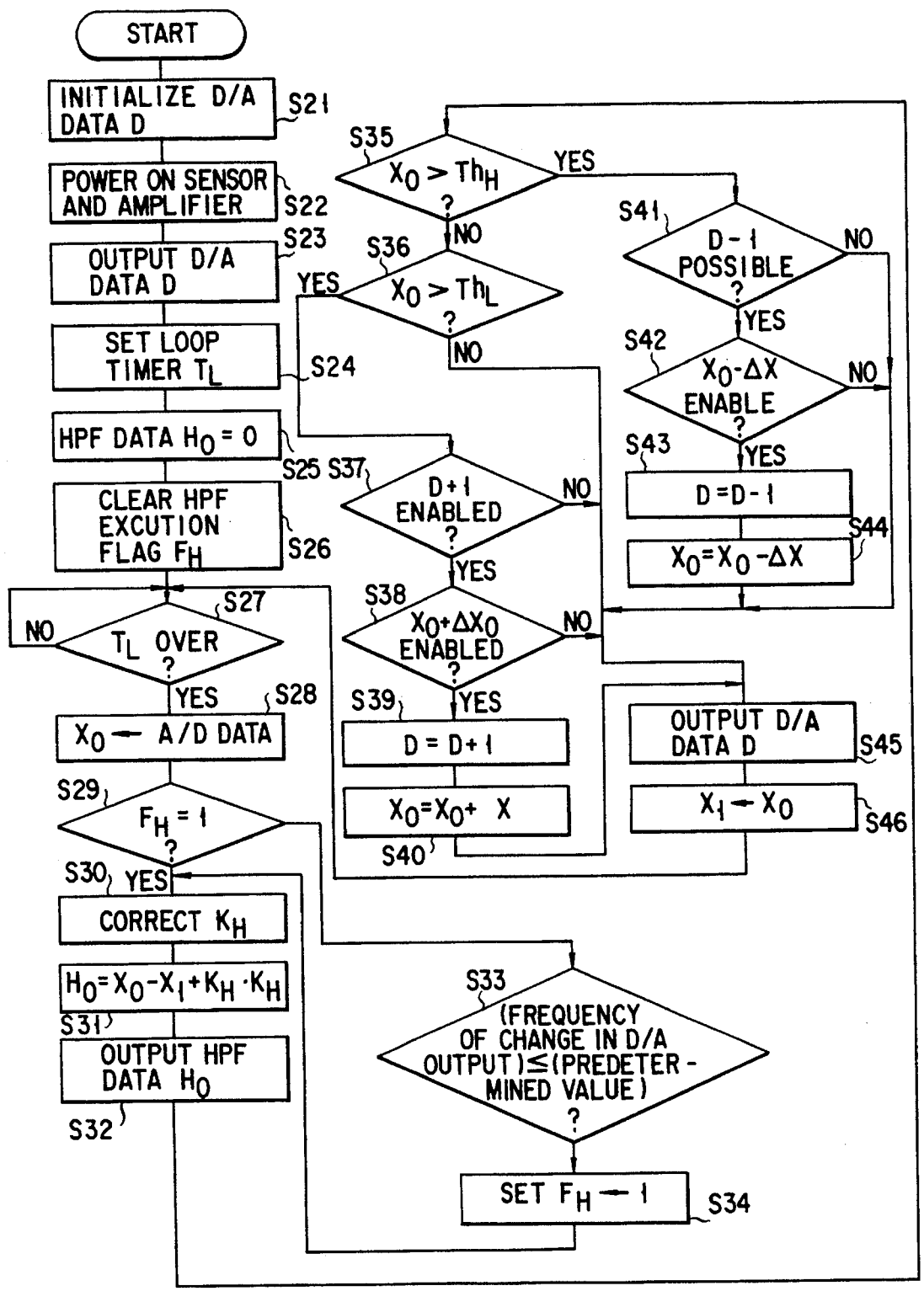
FIG. 9 is a flow chart for explaining the operation of the camera shake detection apparatus in FIG. 8.
Figure 10:
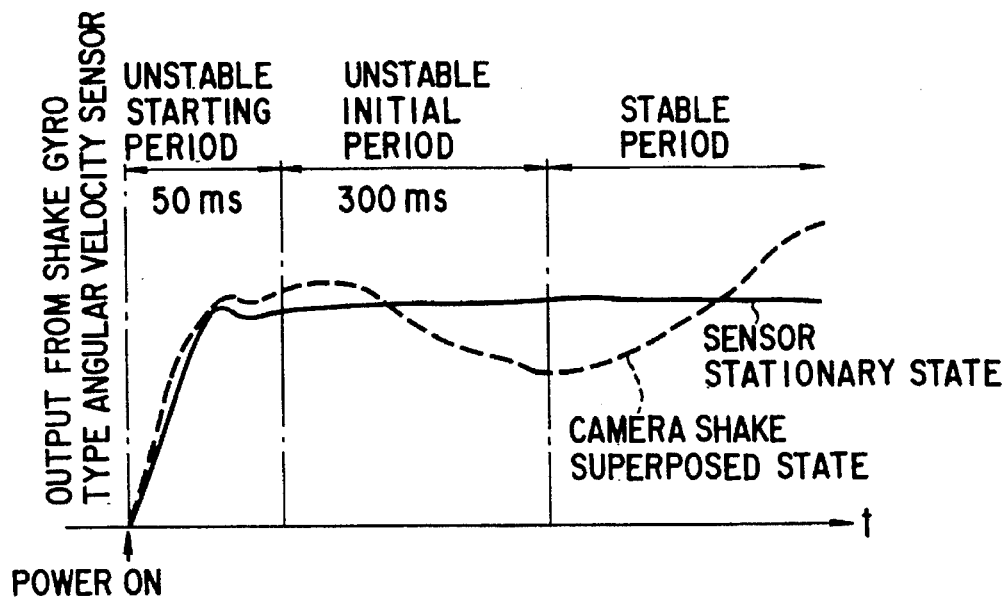
FIG. 10 is a graph showing a change in signal, with time, from a conventional shake gyro type angular velocity sensor at the start time.
Figure 11:
FIG. 11 is a graph showing a change in signal from the conventional shake gyro type angular velocity sensor when a longer time has elapsed.
Figure 12:
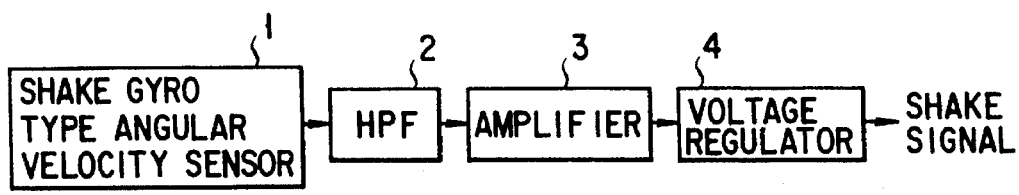
FIG. 12 is a block diagram of a shake detection unit consisting of the conventional typical shake gyro type angular velocity sensor.
Figure 13:
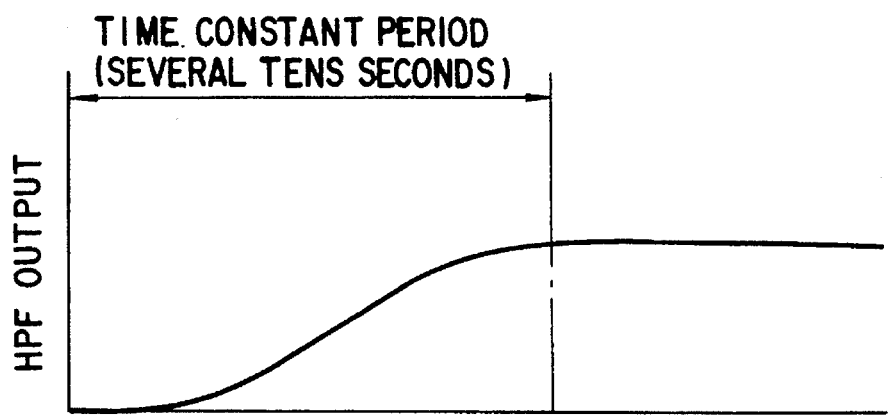
FIG. 13 is a graph showing transition of a shake signal from a shake detection apparatus with the arrangement in FIG. 12 from the start time.
Figure 14:
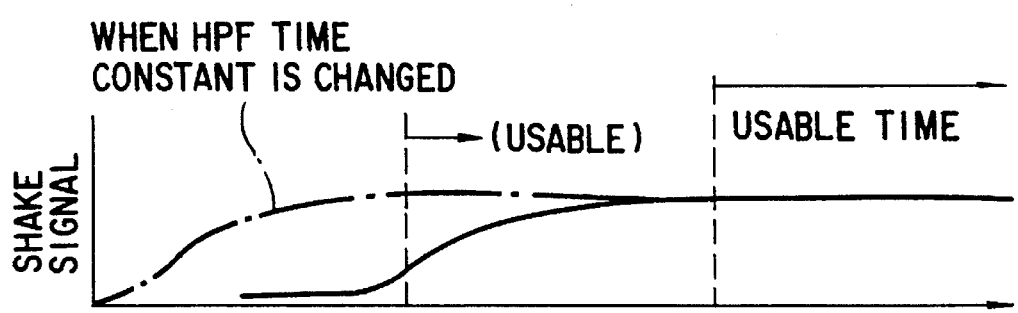
FIG. 14 is a graph showing transition of an output signal from the conventional sensor before and after the start.

The operation of the camera shake detection apparatus shown in FIG. 8 will be described below with reference to the flow chart in FIG. 9.

First of all, the CPU 68 starts to operate, and in step S21, D/A data (D) to be output to the D/A converter 66 is initialized. In this initialization, the data (D) can be set to "0", the medium value of a variable range, or the stable value in the preceding operation. In step S22, the CPU 68 designates to supply power to the shake gyro type angular velocity sensor 64, the operational amplifier 65, the A/D converter 67, and the D/A converter 66. As a matter of course, these parts may be powered on in advance together with the CPU 68.

In step S23, the CPU 68 outputs the D/A data (D) to the D/A converter 66 and causes the D/A converter 66 to output a reference voltage. In step S24, a signal representing the overflow state of a timer is generated every predetermined time interval to periodically process the shake signal, thereby setting a loop timer ($T_L$). Processing is facilitated by constituting this loop timer by an auto-reload type timer. Hereinafter, the flag representing the overflow state of the loop timer $T_L$ is set every predetermined time interval. This time interval is preferably several hundreds μsec to one msec because high-speed feedback is performed considering the speed of A/D or D/A conversion to accurately control the reference voltage. This loop starts from step S27 (to be described later).

In step S25, the CPU 68 initializes the HPF data ($H_0$) (in this case, the HPF data is reset to "0"). In step S26, the CPU 68 clears an HPF execution flag ($F_H$) which is set to perform HPF arithmetic operation in the loop.

From step S27, the loop of arithmetic operation and processing starts.

The CPU 68 checks overflow of the loop timer $T_L$. This operation is repeated until the auto-reload type timer overflows. If the elapse of a predetermined time is confirmed after overflow of the loop timer $T_L$, the flow advances to step S28, and the CPU 68 reads the data from the A/D converter 67. The differentially amplified shake signal is stored in the register $x_0$.

In step S29, the CPU 68 checks whether the HPF execution flag $F_H$ is set, i.e., whether the HPF arithmetic operation is already enabled. If YES in step S29, the flow advances to step S30, and the CPU 68 executes the HPF arithmetic operation. Otherwise, i.e., if the flag is in a reset state, the flow advances to step S33.

In step S33, the CPU 68 checks the change frequency of D/A output data, which is designated to the D/A converter 66. If the D/A output data is frequently changed at a pace higher than a predetermined value, the CPU 68 determines that the sensor output is not stabilized yet. The flow advance to step S35 without performing the HPF arithmetic operation, and the reference voltage is controlled. On the other hand, when the reference voltage is changed at a pace lower than the predetermined value, the CPU 68 determines that the output from the shake gyro type angular velocity sensor 64 is shifted from the unstable starting or initial period to the stable period, and the flow advances to step S34 to set the HPF execution flag. Thereafter, the flow advances to step S30.

In step S30, the CPU 68 performs the HPF arithmetic operation in accordance with the above-described equation, thereby obtaining the current HPF arithmetic operation result $H_0$ from the current A/D conversion data $x_0$, the preceding A/D conversion data $x_1$, the preceding HPF arithmetic operation result $H_0$ (although the preceding HPF arithmetic operation result is represented by $H_1$ in the above equation for the HPF arithmetic operation, the preceding HPF arithmetic operation result is kept left in the register $H_0$ because of program processing), and the coefficient $K_H$ for determining the HPF time constant. Immediately after the HPF arithmetic operation is started, the CPU 68 uses, as the preceding HPF arithmetic operation result $H_0$, the data $H_0$ initialized before the loop from step S27 is started.

The time constant defined by the HPF coefficient is controlled by the loop pass count, as in the first embodiment, and at the same time, the magnitude of the HPF coefficient is initialized by the HPF arithmetic operation result.

After the HPF arithmetic operation, in step S32, the CPU 68 outputs the HPF data $H_0$ as the HPF arithmetic operation result as needed. Thereafter, the flow advances to step S35, and the CPU 68 compares the A/D data $x_0$ as an output from the A/D converter 67 with a predetermined first differential amplification reference value $Th_H$. If the A/D data $x_0$ is larger than the value $Th_H$, the flow advances to step S41, and the CPU 68 decreases the reference voltage supplied from the D/A converter 66, thereby preventing saturation of the output from the operational amplifier 65. If the A/D data $x_0$ is smaller than the value $Th_H$, the flow advances to step S36.

In step S36, the CPU 68 compares the A/D data $x_0$ as the output from the A/D converter 67 with a predetermined second differential amplification reference value $Th_L$. If the A/D data $x_0$ is smaller than the value $Th_L$, the flow advances to step S37, and the CPU 68 increases the reference voltage supplied by the D/A converter 66, thereby preventing saturation at the lower limit of an output from the operational amplifier 65. If the A/D data $x_0$ is larger than the value $Th_L$, the flow advances to step S45.

If the flow advances to step S37 to increase the reference voltage, the CPU 68 checks whether the D/A data D to be designated to the D/A converter 66 can be incremented. This is because the D/A data D cannot be incremented beyond the maximum value of the register D, i.e., a value of level "255". If the register D has a value of level "255", the reference voltage cannot be changed. This is also because, if the D/A data D has a value larger than the interlocked output value of the D/A converter 66 though it is a value of level lower than "255", the D/A data D cannot be incremented beyond the interlocked value. If it is determined that the D/A data D cannot be incremented, the flow advances to step S45 without changing the reference voltage.

If the D/A data D can be incremented, the flow advances to step S38, and the CPU 68 determines whether the A/D data can be corrected when the reference voltage is changed. More specifically, if the arithmetic operation $x_0=x_0+\Delta x$ is to be performed to correct the data $x_0$, the CPU 68 determines whether the sum result falls outside the range of the register $x_0$. If NO in step S38, correction cannot be accurately performed because of some abnormality, and the flow advances to step S45. If the A/D data $x_0$ can be corrected, the flow advances to step S39, and the CPU 68 increments the D/A data D to be output to the D/A converter 66. In correspondence with this processing, the CPU 68 corrects the A/D data $x_0$ in step S40, and the flow advances to step S45.

If the flow advances to step S41 to decrease the reference voltage, the CPU 68 checks whether the D/A data D to be designated to the D/A converter 66 can be decremented. This is because the D/A data D cannot be decremented beyond the minimum value of the register D, i.e., a value of level "0". If the register D has a value of level "0", the reference voltage cannot be changed. This is also because, if the D/A data D has a value smaller than the interlocked output value of the D/A converter 66 though it is a value of level higher than "0", the D/A data D cannot be decremented beyond the interlocked value. If it is determined that the D/A data D cannot be decremented, the flow advances to step S45 without changing the reference voltage.

If the D/A data D can be decremented, the flow advances to step S42, and the CPU 68 determines whether the A/D data can be corrected when the reference voltage is changed. More specifically, if the arithmetic operation $x_0=x_0-\Delta x$ is to be performed to correct the data $x_0$, the CPU 68 determines whether the subtraction result falls outside the range of the register $x_0$. If NO in step S42, correction cannot be accurately performed because of some abnormality, and the flow advances to step S45. If the A/D data $x_0$ can be corrected, the flow advances to step S43, and the CPU 68 decrements the D/A data D to be output to the D/A converter 66. In correspondence with this processing, the CPU 68 corrects the A/D data $x_0$ in step S44, and the flow advances to step S45.

In step S45, the CPU 68 outputs the D/A data D to the D/A converter 66. In step S46, the CPU 68 stores the A/D data $x_0$ to the register $x_1$ of the preceding A/D data for the next HPF arithmetic operation. Thereafter, the flow advances to step S27, and the CPU 68 repeats the above processing.

As described above, the drift and offset components of the output from the shake gyro type angular velocity sensor 64 are removed by the operational amplifier 65, the D/A converter 66, the A/D converter 67, the shake signal correction unit 69, the reference voltage control unit 70, and the HPF arithmetic unit 71 in the CPU 68. With this arrangement, a camera shake detection apparatus capable of effectively removing the drift and offset components in a large dynamic range is constituted.

According to the above embodiments of the present invention, the following arrangements can be obtained:

(1) A camera shake detection apparatus comprising a camera shake sensor means, a high-pass filter arithmetic means for removing drift and offset components of the camera shake sensor means, a time constant increasing means for shifting an upper limit frequency for signal removal of the high-pass filter arithmetic means from a high-frequency side to a low-frequency side, a high-pass filter large signal determination means for detecting a large-shake signal state from an output from the high-pass filter arithmetic means, and a small-time-constant resetting means for shifting the upper limit frequency for signal removal of the high-pass filter arithmetic means to the high-frequency side when a large shake is detected by the high-pass filter large signal determination means.

(2) A camera with a camera shake prevention function, comprising a camera shake detection means consisting of a camera shake sensor means, a high-pass filter arithmetic means for removing drift and offset components of the camera shake sensor means, a time constant increasing means for shifting an upper limit frequency for signal removal of the high-pass filter arithmetic means from a high-frequency side to a low-frequency side, a high-pass filter large signal determination means for detecting a large-shake signal state from an output from the high-pass filter arithmetic means, and a small-time-constant resetting means for shifting the upper limit frequency for signal removal of the high-pass filter arithmetic means to the high-frequency side when a large shake is detected by the high-pass filter large signal determination means, and a camera shake prevention means for preventing a degradation in a to-be-photographed object image, which is caused by a shake in camera, on the basis of an output from the camera shake detection means.

(3) A camera with a camera shake prevention function according to the arrangement (2), wherein the camera shake prevention means is a camera shake correction means for moving the object image on a film, thereby correcting a camera shake.

(4) A camera with a camera shake prevention function according to the arrangement (2), wherein the camera shake prevention means sets a timing for starting exposure of the object image onto a film to a timing with a minimum shake, thereby preventing a degradation in image quality, which is caused by a camera shake.

(5) A camera shake detection apparatus according to the arrangement (1) or a camera with a camera shake prevention function according to the arrangement (2), wherein the camera shake sensor has an arrangement capable of detecting a two-dimensional shake on an image plane.

(6) A camera shake detection apparatus according to the arrangement (1) or a camera with a camera shake prevention function according to the arrangement (2), further comprising a camera shake detection means for detecting a shake in camera such as a camera shake, a reference voltage generation means, a differential amplification means for amplifying a difference in output between the reference voltage generation means and the camera shake detection means, a differential amplification signal correction means for correcting an output from the differential amplification means in accordance with an operation of the reference voltage generation means, and a high-pass filter arithmetic means for receiving an output from the differential amplification signal correction means.

(7) A camera with a camera shake prevention function according to the arrangement (2), further comprising a display means for displaying a status of the time constant increasing means in a finder or on an outer case of the camera.

According to the arrangements (1) to (3), when the sensor output is large because of a large camera shake, the offset component is actively removed by the high-pass filter. When the sensor output is small because of a small camera shake, the camera shake detection frequency band can be extended. Therefore, there is provided a camera with a camera shake prevention function, which can minimize generation of an offset component and effectively and accurately detect a camera shake, thereby preventing a camera shake.

According to the arrangement (4), when the sensor output is large because of a large camera shake, the offset component is actively removed by the high-pass filter. When the sensor output is small because of a small camera shake, the camera shake detection frequency band can be extended. Therefore, there is provided a compact and inexpensive camera with a camera shake prevention function, which can minimize generation of an offset component and effectively and accurately detect a camera shake, thereby preventing a camera shake by a simple method.

According to the arrangement (5), there is provided a camera shake detection apparatus capable of detecting a two-dimensional shake on an image plane or a camera with a camera shake prevention function, which can prevent a two-dimensional shake on an image plane.

As described above, according to the present invention, when the sensor output is large because of a large camera shake, the offset component is actively removed by the high-pass filter. When the sensor output is small because of a small camera shake, the camera shake detection frequency band can be extended. Therefore, generation of an offset component can be minimized, and a camera shake can be effectively and accurately detected.

In addition, according to the present invention, when the sensor output is large because of a large camera shake, the offset component is actively removed by the high-pass filter. When the sensor output is small because of a small camera shake, the camera shake detection frequency band can be extended. Therefore, there is provided a camera shake prevention apparatus which can minimize generation of an offset component and effectively and accurately detect a camera shake, thereby preventing a camera shake.

Furthermore, according to the present invention, there is provided a camera shake detection apparatus having a wide dynamic range. There is also provided a camera shake detection apparatus which exhibits high performance even when the sensor has a large temperature drift or offset, or a camera prevention apparatus using this apparatus.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A shake detection apparatus comprising:

shake detection sensor means for detecting a shake state to output a shake detection signal;

high-pass filter arithmetic means for performing high-pass filter arithmetic processing, thereby removing drift and offset components contained in the shake detection signal output from said shake detection sensor means;

time constant increasing means for shifting an upper limit frequency for high-pass filter arithmetic processing by said high-pass filter arithmetic means from a high-frequency side to a low-frequency side;

large-shake-signal determination means for detecting a large shake signal state on the basis of an output from said high-pass filter arithmetic means; and small-time-constant resetting means for shifting the upper limit frequency for high-pass filter arithmetic processing by said high-pass filter arithmetic means to the high-frequency side when the large shake signal state is detected by said large-shake-signal determination means.

2. An apparatus according to claim 1, wherein said shake detection sensor means can detect a two-dimensional shake.

3. An apparatus according to claim 1, further comprising reference voltage generation means for generating a reference voltage, differential amplification means for amplifying a difference between the reference voltage generated by said reference voltage generation means and the shake detection signal output from said shake detection sensor means, and amplification signal correction means for correcting an output from said differential amplification means in accordance with the reference voltage generated by said reference voltage generation means, and wherein said high-pass filter arithmetic means receives an output from said amplification signal correction means to perform high-pass filter arithmetic processing.

4. A camera with a camera shake prevention function, comprising:

camera shake detection sensor means for detecting a camera shake applied to said camera to output a camera shake detection signal;

high-pass filter arithmetic means for performing high-pass filter arithmetic processing, thereby removing drift and offset components contained in the camera shake detection signal output from said camera shake detection sensor means;

time constant increasing means for shifting an upper limit frequency for high-pass filter arithmetic processing by said high-pass filter arithmetic means from a high-frequency side to a low-frequency side;

large-shake signal determination means for detecting a large-shake signal state on the basis of an output from said high-pass filter arithmetic means;

small-time-constant resetting means for shifting the upper limit frequency for high-pass filter arithmetic processing by said high-pass filter arithmetic means to the high-frequency side when the large-shake signal state is detected by said large-shake signal determination means; and camera shake prevention means for preventing a degradation in a photographic image, which is caused by a camera shake in said camera, on the basis of an output from said high-pass filter arithmetic means.

5. A camera according to claim 4, wherein said camera shake prevention means has camera shake correction means for moving the photographic image focused on a film, thereby correcting the camera shake.

6. A camera according to claim 4, wherein said camera shake prevention means has means for setting a timing for starting exposure of the photographic image onto a film to a timing with a minimum shake, thereby preventing a degradation in quality of the photographic image, which is caused by the camera shake.

7. A camera according to claim 4, wherein said camera shake detection sensor means can detect a two-dimensional shake.

8. A camera according to claim 4, further comprising
reference voltage generation means for generating a reference voltage,
differential amplification means for amplifying a difference between the reference voltage generated by said reference voltage generation means and the camera shake detection signal output from said camera shake detection sensor means, and
amplification signal correction means for correcting an output from said differential amplification means in accordance with the reference voltage generated by said reference voltage generation means, and wherein said high-pass filter arithmetic means receives an output from said amplification signal correction means to perform high-pass filter arithmetic processing.

9. A camera according to claim 4, further comprising display means for displaying a status of said time constant increasing means in a finder or on an outer case of said camera.

10. A shake detection apparatus for a camera, comprising:
a shake detection sensor for detecting a shake applied to said camera to output a shake detection signal;
a high-pass filter for removing drift and offset components contained in the shake detection signal output from said shake detection sensor; and
time constant changing means for changing a cutoff frequency of said high-pass filter, said time constant changing means changing the cutoff frequency on the basis of the shake detection signal output from said shake detection sensor.

11. An apparatus according to claim 10, wherein said time constant changing means determines a large shake when an output from said shake detection sensor is larger than a predetermined value and changes the cutoff frequency to a high-frequency side.

12. An apparatus according to claim 10, wherein said time constant changing means sets the cutoff frequency on a high-frequency side in a power-on operation of said shake detection sensor and gradually shifts the cutoff frequency to a low-frequency side.

13. An apparatus according to claim 10, wherein said high-pass filter obtains a high-pass filter arithmetic output $H_0$ in accordance with the following formula:

$$H_0 = x_0 - x_1 + (K_H \times H_1)$$

where $H_1$ is a preceding high-pass filter arithmetic output, $x_1$ is a preceding input shake signal from said shake detection sensor, $x_0$ is a current input shake signal, and $K_H$ is a high-pass filter coefficient.

14. An apparatus according to claim 13, wherein said time constant changing means changes the high-pass filter coefficient $K_H$ on the basis of an output from said shake detection sensor.

15. A camera shake detection apparatus comprising:
camera shake sensor means for detecting a camera shake state to output a camera shake detection signal;
high-pass filter arithmetic means for removing drift and offset components contained in the camera shake detection signal output from said camera shake sensor means;
first time constant changing means for shifting a cutoff frequency of said high-pass filter arithmetic means from a high-frequency side to a low-frequency side; and
second time constant changing mean for shifting the cutoff frequency of said high-pass filter arithmetic means to the high-frequency side when a large shake state is detected on the basis of an output from said high-pass filter arithmetic means.

16. An apparatus according to claim 15, further comprising
reference voltage generation means for generating a reference voltage,
differential amplification means for amplifying a difference between the reference voltage from said reference voltage generation means and the camera shake detection signal from said camera shake sensor means,
reference voltage control means for changing the reference voltage generated by said reference voltage generation means in accordance with an output from said differential amplification means, and
correction arithmetic means for correcting the output from said differential amplification means in accordance with the reference voltage, and
wherein said high-pass filter arithmetic means receives an output from said correction arithmetic means.

17. An apparatus according to claim 15, wherein said camera shake sensor means includes an angular velocity sensor for detecting a rotational shake state of said camera shake detection apparatus as an angular velocity.

18. A camera shake prevention apparatus for a photographing apparatus, comprising:
a camera shake detection apparatus comprising
a) camera shake sensor means for detecting a camera shake state to output a camera shake detection signal,
b) high-pass filter arithmetic means for removing drift and offset components contained in the camera shake detection signal output from said camera shake sensor means,
c) first time constant changing means for shifting a cutoff frequency of said high-pass filter arithmetic means from a high-frequency side to a low-frequency side, and
d) second time constant changing mean for shifting the cutoff frequency of said high-pass filter arithmetic means to the high-frequency side when a large shake state is detected on the basis of an output from said high-pass filter arithmetic means; and
camera shake prevention means for preventing a degradation in a photographic image, which is caused by a camera shake, on the basis of an output from said camera shake detection apparatus.

19. An apparatus according to claim 18, further comprising
reference voltage generation means for generating a reference voltage,
differential amplification means for amplifying a difference between the reference voltage from said reference voltage generation means and the camera shake detection signal from said camera shake sensor means,
reference voltage control means for changing the reference voltage generated by said reference voltage generation means in accordance with an output from said differential amplification means, and
correction arithmetic means for correcting the output from said differential amplification means in accordance with the reference voltage, and wherein said high-pass filter arithmetic means receives an output from said correction arithmetic means.

20. An apparatus according to claim 18, wherein said camera shake prevention means has image movement prevention means for preventing movement of the photographic image on photographing means of said photographing apparatus on the basis of the output from said camera shake detection apparatus.

21. An apparatus according to claim 18, wherein said camera shake prevention means controls an operation of said photographing apparatus such that exposure of a photographic image onto photographing means of said photographing apparatus is enabled when the output from said camera shake detection apparatus is small.

22. A shake detection apparatus comprising:

shake sensor means for detecting a shake state to output a shake detection signal;

high-pass filter arithmetic means for removing drift and offset components contained in the shake detection signal output from said shake sensor means;

first time constant changing means for shifting a cutoff frequency of said high-pass filter arithmetic means from a high-frequency side to a low-frequency side;

determination means for determining, on the basis of an output from said high-pass filter arithmetic means, that a magnitude of the shake state is not less than a predetermined value; and second time constant changing means for shifting the cutoff frequency of said high-pass filter arithmetic means to the high-frequency side when the shake state having the magnitude not less than the predetermined value is detected by said determination means.

23. An apparatus according to claim 22, wherein said shake sensor means includes angular velocity sensor means for detecting a rotational shake state of said apparatus as an angular velocity.

24. A shake detection apparatus comprising:

shake sensor means for detecting a shake state to output a shake detection signal;

high-pass filter arithmetic means for removing drift and offset components contained in the shake detection signal output from said shake sensor means;

first time constant changing means for shifting a cutoff frequency of said high-pass filter arithmetic means from a high-frequency side to a low-frequency side; and second time constant changing means for changing the cutoff frequency of said high-pass filter arithmetic means on the basis of a magnitude of the shake state.

25. An apparatus according to claim 24, wherein said shake sensor means includes angular velocity sensor means for detecting a rotational shake state of said apparatus as an angular velocity.

26. A shake detection apparatus comprising:

shake sensor means for detecting a shake state to output a shake detection signal;

high-pass filter arithmetic means for removing drift and offset components contained in the shake detection signal output from said shake sensor means; and time constant changing means for shifting a cutoff frequency of said high-pass filter arithmetic means from a high-frequency side to a low-frequency side on the basis of the shake state.

27. An apparatus according to claim 26, wherein said shake sensor means includes angular velocity sensor means for detecting a rotational shake state of said apparatus as an angular velocity.

* * * * *